Sept. 7, 1965 W. LÄNGE 3,204,718
POWER TRAIN ARRANGEMENT FOR MOTOR VEHICLES
Filed Feb. 12, 1963 3 Sheets-Sheet 1

WALTER LÄNGE
INVENTOR
BY John R. Faulkner
Clifford L. Sadler
ATTORNEYS

Sept. 7, 1965    W. LÄNGE    3,204,718
POWER TRAIN ARRANGEMENT FOR MOTOR VEHICLES
Filed Feb. 12, 1963    3 Sheets-Sheet 2

WALTER LÄNGE
INVENTOR
BY John R. Faulkner
Clifford L. Sadler
ATTORNEYS

Sept. 7, 1965 W. LÄNGE 3,204,718
POWER TRAIN ARRANGEMENT FOR MOTOR VEHICLES
Filed Feb. 12, 1963 3 Sheets-Sheet 3

WALTER LÄNGE
INVENTOR
BY John R. Faulkner
Clifford L. Sadler
ATTORNEYS

United States Patent Office 3,204,718
Patented Sept. 7, 1965

3,204,718
POWER TRAIN ARRANGEMENT FOR MOTOR VEHICLES
Walter Länge, Leverkusen, Germany, assignor to Ford Motor Company, Dearborn, Mich., a corporation of Delaware
Filed Feb. 12, 1963, Ser. No. 258,004
7 Claims. (Cl. 180—73)

The present invention relates to a power train arrangement for motor vehicles having a front mounted engine and transmission and a rear mounted rigid driving axle. This invention comprises an arrangement whereby vibrations coming from the power train are isolated from the vehicle body as much as possible.

It is conventional vehicle design practice to provide an engine and transmission that are rigidly interconnected and supported forwardly on a vehicle chassis at three points. It is also conventional practice to connect a rigid rear axle with the transmission by means of an exposed propeller shaft and universal joints. There are normally vibrations originating in the engine and various parts of the power train such as those caused by irregularities in the forces of inertia and the pulsations resulting from combustion within the engine. These vibrations are transmitted to the chassis over the three mounting points of the engine and they are also transmitted through the propeller shaft to the rear axle. Changes in the angular velocities of the universal joints, if they are not of a constant velocity type, will have an accumulative effect upon power train vibrations.

In view of these problems and the state of the art, it is the principal object of the present invention to provide a power train arrangement in which some of these vibrations are eliminated and in which the remainder are isolated from the vehicle chassis by employing a minimum number of mounting points connecting the engine and the power train to the chassis. This object and its many other advantages are achieved in the several embodiments illustrated in the attached drawings.

In one of the embodiments of the invention, the engine and transmission case are rigidly connected and supported from the vehicle chassis by laterally spaced apart resilient mounting means. The transmission case is rigidly connected to the rear axle housing by means of a tube that concentrically surrounds the drive shaft. With this arrangement, when the rear wheels and axle move in jounce and rebound, the engine will be rocked about a transverse axis passing through the laterally spaced apart engine mounts.

For a full understanding of the invention and the several illustrated embodiments, attention is directed to the following description and the accompanying drawings, in which.

Reference is now made to the drawings for a full understanding of the several embodiments of this invention. Like reference numerals identify like parts throughout the various views.

Figures 1, 2:
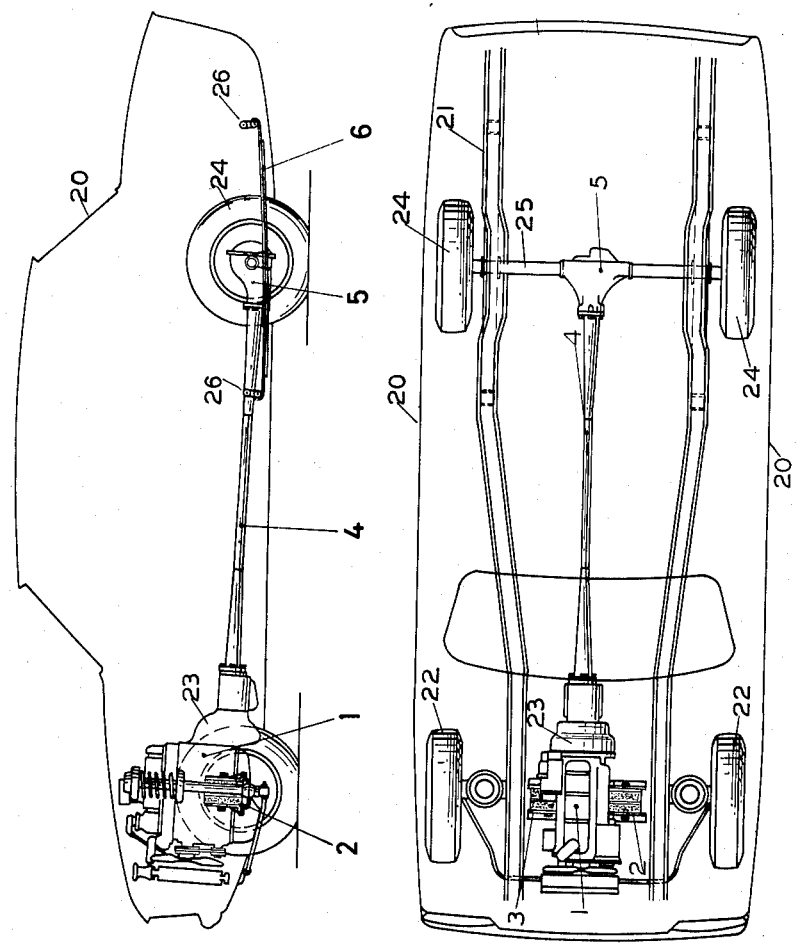
FIGURE 1 is a side elevational view of a vehicle incorporating the present invention.
FIGURE 2 is a top plan view of the structure disclosed in FIGURE 1.

FIGURES 1 and 2 disclose a vehicle having a body 20 indicated in outlined form. The body 20 includes a supporting frame 21 that may be secured thereto by bolting or welding. A pair of steerable wheels 22 are situated forwardly in the body and secured to the frame 21 in a conventional fashion by a suspension system.

An engine 1 is located between the front wheels 22 and mounted upon the chassis 21 by left and right resilient mounts as indicated by the reference numerals 2 and 3. A transmission case 23 is rigidly bolted to the engine 1. A rigid tube 4 has its forward end secured to the transmission case 23 and extends rearwardly therefrom.

At the rear of the vehicle, a pair of driving wheels 24 are provided. The wheels 24 are rotatably supported from a rigid axle housing 25. Centrally disposed in the axle housing 25 is a differential gear unit 5. The tube 4 is rigidly connected to the housing of the differential 5. A drive shaft is contained within the drive tube 4 for transmitting torque from the engine 1 and transmission 23 to the differential 5 and the rear wheels 24.

A leaf type suspension spring 6 is secured to the axle housing 25 adjacent each of the rear wheels 24. The spring 6 is connected to the chassis frame 21 by front and rear shackles 26.

With the embodiment illustrated in FIGURES 1 and 2, the engine 1 and transmission 23 are rigidly connected to the rear axle housing 25 and differential 5 by the drive tube 4. When the rear wheels 24 move in jounce and rebound, the motion will be transmitted to the engine 1 and transmission 23 causing these units to rock about a transverse axis passing through the resilient mounts 2 and 3. The mounts 2 and 3 also carry thrust forces resulting from acceleration and braking of the rear wheels.

Figure 3:
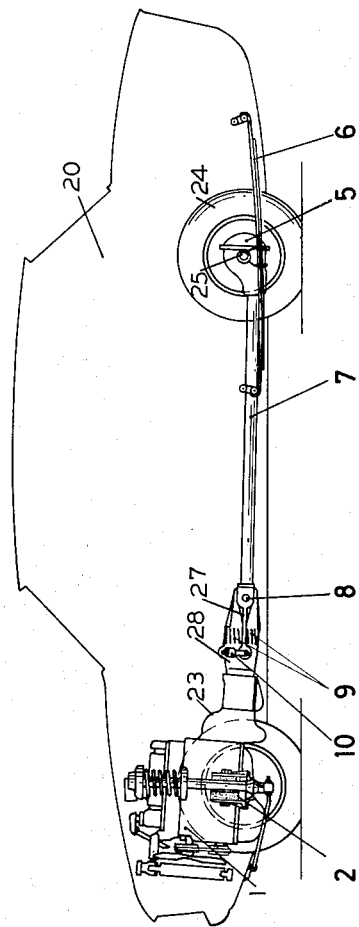
FIGURE 3 is a side elevational view corresponding to FIGURE 1 and illustrating an alternate construction of the invention.

FIGURE 3 illustrates a modification of the invention disclosed in FIGURE 1. In the embodiment of FIGURE 3, a joint 8 is provided in the drive tube 7 which interconnects the rear axle structure with the transmission 23. This joint 8 has a transverse pivot axis. An arm 27 extends forwardly from the drive tube 7 and is engaged by a pair of springs 9. The end of the extending arm 27 connects to a dampening means 10 such as a shock absorber. The springs 9 and damper 10 are interposed between the extension 27 and a housing 28 extending rearwardly from the transmission case 23.

With the arrangement of FIGURE 3, relative movement is permitted between the rear axle 25 and the engine 1. This relative movement is resiliently resisted by the springs 9 and damped by the damper 10. With the construction of FIGURE 3, normal jounce and rebound movement of the rear wheels 24 will be absorbed in the springs 9 and damper 10, and not transmitted to the engine 1 and the transmission 23. Upon extreme jounce or rebound movement, however, the engine 1 and transmission 23 will rock about an axis passing through the resilient mounts 2 and 3 much in the same manner as in the embodiment of the invention illustrated in FIGURES 1 and 2.

Figure 4:
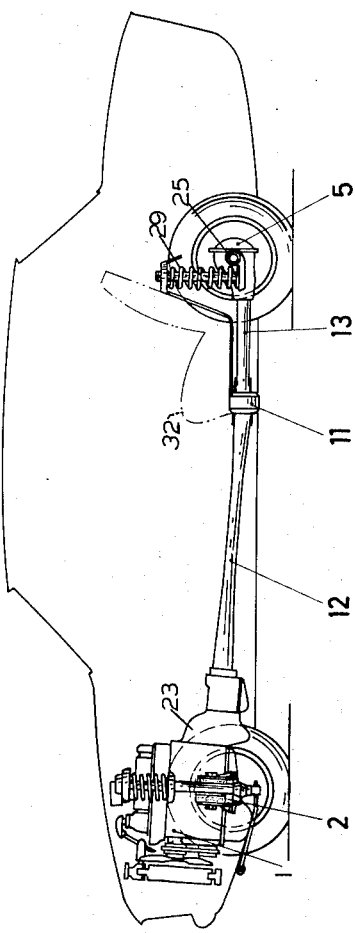
FIGURE 4 is another side elevational view corresponding to FIGURE 1 and illustrating a further embodiment of the invention.

FIGURE 4 illustrates an embodiment of the invention wherein a chassis support 11 is provided for a rigid tube 12 which extends rearwardly from the transmission case 23. In this embodiment, the engine 1 and transmission 23 are supported on the chassis by the two front resilient mounts 2 and 3 and the chassis mount 11 which is located in the approximate area of the forward edge of the passenger seat 32.

A drive tube 13 extends from the chassis support 11 and is connected with the differential housing 5. A coil spring type suspension unit 29 supports the rear portion of the vehicle body 20 on the rear axle 25. A universal joint is provided in the drive shaft at the support 11 to accommodate jounce and rebound movement of the unsprung rear suspension components. Because the rigid tube 12 is secured to the chassis, the tunnel in the floor pan of the passenger compartment may be constructed to have a minimum height.

Unlike the embodiments of FIGURES 1, 2 and 3, the resilient supports 2 and 3 for the engine 11 do not necessarily have to carry the driving forces or thrust. In this embodiment, these forces can also be taken by the support 11 which in this case contains a thrust bearing.

Figure 5:
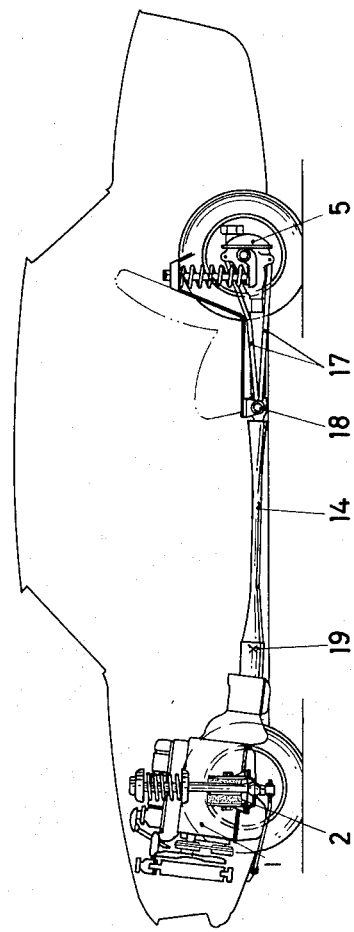
FIGURE 5 is a side elevational view corresponding to FIGURE 1 and disclosing a still further embodiment of the invention.
Figure 6:
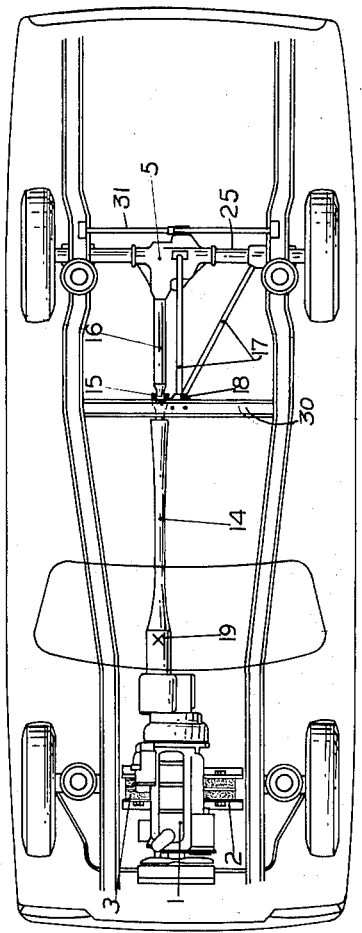
FIGURE 6 is a top plan view of the embodiment illustrated in FIGURE 5.

FIGURES 5 and 6 illustrate another embodiment of the invention. In this arrangement, a rigid tube 14 surrounds the drive shaft and extends rearwardly from the transmission case 23. A universal joint 15 is connected to the rear end of the driving shaft contained within the tube 14 and is connected to an extension 16 on the front of the differential gear 5. The rear axle housing 25 is guided by a pair of tie rods 17 that are angularly arranged as illustrated in both FIGURES 5 and 6. The rods 17 are connected to a single pivotal support 18 that is in transverse alignment with the universal joint 15 of the drive shaft. The rear ends of tie rods 17 are both vertically and laterally spaced apart and connected to the axle housing 25. Transverse stability of the rear suspension is maintained by track bars 31.

The pivotal support 18 is carried by a cross member 30 that forms a part of the frame 21. In this arrangement, the engine is supported by the front resilient mounts 2 and 3, and the tube 14 which finds its support on the drive shaft near the universal joint 15. The drive tube 16 supports the rear drive shaft in a manner that allows the universal joint 15 only very small movements relative to the cross member 30. There is no connection between the universal joint 15 as well as the tubes 14 and 16 to any part of the frame. A universal joint may be located in the drive shaft at the point indicated by reference numeral 19 to permit the engine 1 to be canted for reducing the transmission hump in the front passenger compartment.

The foregoing description presents the presently preferred embodiments of this invention. Other modifications may occur to those skilled in the art which will come within the scope and spirit of the following claims.

What is claimed is:

1. A motor vehicle having a frame structure and a power unit, mounting means connecting said unit to the forward end of said structure and adapted to permit said unit to rock about a generally transverse axis, a pair of rear driving wheels rotatably connected to a rigid axle housing means, suspension means connecting said axle housing means to said structure and adapted to permit said driving wheels and said axle housing means to move in jounce and rebound, a rigid support member rigidly secured to said axle housing means, pivot means interconnecting said rigid support member and said unit, said pivot means being adapted to permit relative movement between said axle housing means and said unit, said pivot means having a transverse pivot axis, and resilient means connected to said support member and said unit and adapted to resiliently resist said relative movement, whereby when said wheels move in jounce and rebound said unit is caused to rock about said axis.

2. A motor vehicle having a frame structure and a power unit, mounting means connecting said unit to the forward end of said structure and adapted to permit said unit to rock about a generally transverse axis, a pair of rear driving wheels rotatably connected to a rigid axle housing means, suspension means connecting said axle housing means to said structure and adapted to permit said driving wheels and said axle housing means to move in jounce and rebound, a rigid support member rigidly secured to said axle housing means, pivot means interconnecting said rigid support member and said unit, said pivot means being adapted to permit relative movement between said axle housing means and said unit, said pivot means having a transverse pivot axis, an arm extending from said rigid support member, spring means interposed between said arm and a member rigid with said unit, said spring means being adapted to resiliently resist relative movement between said rigid support member and said unit, whereby when said wheels move in jounce and rebound said unit is caused to rock about said axis.

3. A motor vehicle having a frame structure and a power unit, mounting means connecting said unit to the forward end of said structure and adapted to permit said unit to rock about a generally transverse axis, a pair of rear driving wheels rotatably connected to a rigid axle housing means, suspension means connecting said axle housing means to said structure and adapted to permit said driving wheels and said axle housng means to move in jounce and rebound, a rigid support member rigidly secured to said axle housing means, pivot means interconnecting said rigid support member and said unit, said pivot means being adapted to permit relative movement between said axle housing means and said unit, said pivot means having a transverse pivot axis, and resilient means adapted to resiliently resist said relative movement, damper means interconnecting said rigid support member and said unit and adapted to restrict relative movement therebetween, whereby when said wheels move in jounce and rebound said unit is caused to rock about said axis.

4. A motor vehicle having a frame structure and a power unit, mounting means connecting said unit to the forward end of said structure and adapted to permit said unit to rock about a generally transverse axis, a pair of rear driving wheels rotatably connected to a rigid axle housing means, suspension means connecting said axle housing means to said structure and adapted to permit said driving wheels and said axle housing means to move in jounce and rebound, said suspension means including a leaf spring connected to said axle housing means adjacent each of said wheels, a front shackle and a rear shackle connecting the ends of each of said leaf springs with said frame structure, a rigid support member rigidly secured to said axle housing means, pivot means interconnecting said rigid support member and said unit, said pivot means being adapted to permit relative movement between said axle housing means and said unit, said pivot means having a transverse pivot axis, and resilient means connected to said rigid support member and said unit adapted to resiliently resist said relative movement.

5. A motor vehicle having a chassis and a power unit, a pair of spaced apart mounting means connecting said unit to a forward portion of said chassis, a rigid support member having its forward end rigidly connected to said unit and extending rearwardly from said unit, said mounting means comprising the sole direct connections between the said member and unit and the said chassis, a drive shaft rotatably supported in said support member, a pair of rear driving wheels rotatably connected to a rigid axle housing means, a shaft member extending forwardly from said axle housing means and pivotally connected to said rear end of said drive shaft, first and second suspension arms extending forwardly from said axle housing means, said first and second arms having a common pivotal connection with said chassis, said first and second arms supporting said axle housing means against rotation about the axis of said wheels, said common pivotal connection being in transverse alignment with said first mentioned pivotal connection.

6. A motor vehicle having a chassis and a power unit, a pair of spaced apart mounting means connecting said unit to a forward portion of said chassis, a rigid support member having its forward end rigidly connected to said unit and extending rearwardly from said unit, said mounting means comprising the sole direct connections between the said member and said unit and the said chassis, a drive shaft rotatably supported in said support member, a pair of rear driving wheels rotatably connected to a rigid axle housing means, a shaft member extending forwardly from said axle housing means and pivotally connected to said rear end of said drive shaft, first and second suspension arms extending in a forward direction from said axle housing means, said first and second arms having a common pivotal connection with said chassis, said common pivotal connection being in transverse alignment with said first mentioned pivotal connection, said first and second arms supporting said axle housing means against rotation about the axis of said wheels, one of said arms being connected to said axle housing means at a point above the rotational axis of said wheels and the other of said arms being connected to said axle housing means at a point below the rotational axis of said wheels.

7. A motor vehicle having a chassis and a power unit, a pair of spaced apart mounting means connecting said unit to a forward portion of said chassis, a rigid support member having its forward end rigidly connected to said unit and extending rearwardly from said unit, said mounting means comprising the sole direct connections between the said member and said unit and the said chassis, a drive shaft rotatably supported in said support member, a pair of rear driving wheels rotatably connected to a rigid axle housing means, a shaft member extending forwardly from said axle housing means and pivotally connected to said rear end of said drive shaft, a first suspension arm extending longitudinally of said vehicle in a forward direction from said axle housing means, a second arm angularly situated with respect to said first arm and extending forwardly from said axle housing means, said first and second arms having a common pivotal connection with said chassis, said common pivotal connection being in transverse alignment with said first mentioned pivotal connection, said first and second arms supporting said axle housing means against rotation about the axis of said wheels, one of said arms being connected to said axle housing means at a point above the rotational axis of said wheels and the other of said arms being connected to said axle housing means at a point below the rotational axis of said wheels.

References Cited by the Examiner

UNITED STATES PATENTS

| 786,349 | 4/05 | Duryea | 180—64 |
| 1,795,731 | 3/31 | Meister | 180—57 |
| 2,027,329 | 1/36 | Van Ranst | 180—85 |
| 2,155,953 | 4/39 | Nyland | 180—70 |
| 2,198,354 | 4/40 | Tjaarda | 180—73 |
| 2,204,989 | 6/40 | Haltenberger | 180—73 |
| 2,257,630 | 9/41 | Wahlberg et al. | 180—57 |
| 2,716,461 | 8/55 | MacPherson | 180—64 |

FOREIGN PATENTS

| 24,535 | 10/13 | Great Britain. |
| 25,142 | 5/09 | Great Britain. |

A. HARRY LEVY, *Primary Examiner.*